United States Patent [19]

Brachman et al.

[11] Patent Number: 5,464,470
[45] Date of Patent: Nov. 7, 1995

[54] COLOR-CHANGING MARKING COMPOSITION SYSTEM

[75] Inventors: Armand Brachman, Emmaus; Keith Allison, Allentown, both of Pa.

[73] Assignee: Binney & Smith Inc., Easton, Pa.

[21] Appl. No.: 386,695

[22] Filed: Feb. 10, 1995

[51] Int. Cl.[6] .................................................. C09D 11/12
[52] U.S. Cl. ................ 106/22 A; 106/22 B; 106/21 R; 106/21 A; 106/19 B
[58] Field of Search ......................... 106/22 A, 22 B, 106/21 R, 21 A, 19 B

[56] References Cited

U.S. PATENT DOCUMENTS

| | | | |
|---|---|---|---|
| 2,086,745 | 7/1937 | Sell | 106/22 B |
| 2,305,098 | 12/1942 | Minnear | 106/23 B |
| 2,555,474 | 6/1951 | deVries | 106/22 H |
| 2,559,608 | 7/1951 | Ehrlich | 106/22 A |
| 2,589,306 | 3/1952 | Steiner | 106/22 A |
| 3,400,003 | 9/1968 | Guertin | 106/22 R |
| 3,617,325 | 11/1971 | Spokes et al. | 427/145 |
| 3,627,546 | 12/1971 | Coppeta | 106/21 A |
| 3,672,842 | 6/1972 | Florin | 106/21 A |
| 3,700,603 | 10/1972 | Rembaum | 106/21 A |
| 3,705,045 | 12/1972 | Nadolski | 106/22 D |
| 3,870,435 | 3/1975 | Watanabe et al. | 427/145 |
| 3,873,185 | 3/1975 | Rogers | 430/4 |
| 3,876,496 | 4/1975 | Lozano | 106/21 A |
| 3,886,083 | 5/1975 | Laxer | 106/21 A |
| 3,941,488 | 3/1976 | Maxwell | 401/17 |
| 3,945,836 | 3/1976 | Miyata | 106/22 R |
| 3,945,837 | 3/1976 | Miyata et al. | 106/22 D |
| 3,957,495 | 5/1976 | Teranishi et al. | 106/21 A |
| 3,966,400 | 6/1976 | Birke et al. | 8/14 |
| 3,979,550 | 9/1976 | Panken | 106/21 R |
| 3,982,251 | 9/1976 | Hochberg | 106/21 A |
| 3,990,839 | 11/1976 | von der Eltz et al. | 8/14 |
| 4,028,118 | 6/1977 | Nakasuji et al. | 106/21 A |
| 4,070,194 | 1/1978 | Arakawa | 106/21 E |
| 4,071,645 | 1/1978 | Kahn | 106/6 |
| 4,098,738 | 7/1978 | Buerkley et al. | 428/511 |
| 4,139,965 | 2/1979 | Curry et al. | 427/333 |
| 4,162,164 | 7/1979 | Lin | 106/21 R |

(List continued on next page.)

FOREIGN PATENT DOCUMENTS

| | | |
|---|---|---|
| 282178 | 2/1988 | European Pat. Off. . |
| 289141 | 3/1988 | European Pat. Off. . |
| 352796 | 7/1989 | European Pat. Off. . |
| 2241653 | 3/1975 | France . |
| 2487372 | 3/1981 | France . |
| 551775 | 6/1932 | Germany . |
| 2834459 | 8/1978 | Germany . |
| 2724820 | 3/1979 | Germany . |
| 2927006 | 7/1979 | Germany . |
| 2927005 | 1/1981 | Germany . |
| 3207217 | 2/1982 | Germany . |
| 59-86672 | 5/1984 | Japan . |
| 59-179572 | 10/1984 | Japan . |
| 62-28834 | 6/1987 | Japan . |
| 1-103676 | 4/1989 | Japan . |
| 3-243673 | 10/1991 | Japan . |
| 1455678 | 1/1975 | United Kingdom . |
| 94/06872 | 3/1994 | WIPO . |

OTHER PUBLICATIONS

Photocopy of the Packaging Material for Crayola Overwriters, Binney & Smith, Inc., Easton, Pa. (1993) and Photocopy of the Packaging Material for Crayola Changeables, Binney & Smith, Inc., Easton, Pa. (1993).
"Color Fibre Pen Inks", BASF Brochure, (1979).

*Primary Examiner*—Helene Klemanski
*Attorney, Agent, or Firm*—Leydig, Voit & Mayer, Ltd.

[57] ABSTRACT

A color-changing marking composition system, suitable for use in the form of crayons and pencils, comprising a first marking composition comprising wax, a dye, which is other than a Leuco dye and which is capable of changing color upon contact with a color change-inducing compound, and a solvent capable of solubilizing the dye; and a second marking composition comprising wax and a color change-inducing compound, which is capable of inducing a color change in a dye in a marking composition with which it is brought in contact.

32 Claims, No Drawings

U.S. PATENT DOCUMENTS

| | | | |
|---|---|---|---|
| 4,171,982 | 10/1979 | Lin | 106/21 A |
| 4,176,361 | 11/1979 | Kawada et al. | 106/20 R |
| 4,193,906 | 3/1980 | Hatanaka | 106/23 B |
| 4,212,676 | 7/1980 | Ueda | 106/19 B |
| 4,213,717 | 7/1980 | Lin | 106/22 B |
| 4,227,930 | 10/1980 | Lin | 106/22 B |
| 4,246,033 | 1/1981 | von Wartburg | 106/23 B |
| 4,252,845 | 2/1981 | Griffiths et al. | 106/21 A |
| 4,256,494 | 3/1981 | Yamamoto et al. | 106/22 A |
| 4,262,935 | 4/1981 | Andersen et al. | 428/488 |
| 4,322,466 | 3/1982 | Tomlinson | 106/21 R |
| 4,352,691 | 10/1982 | Owatari et al. | 106/22 R |
| 4,413,266 | 11/1983 | Aviram et al. | 106/22 B |
| 4,428,994 | 1/1984 | Rawlins | 427/260 |
| 4,460,727 | 7/1984 | Shoji | 106/23 R |
| 4,490,177 | 12/1984 | Shioi et al. | 106/22 R |
| 4,505,749 | 3/1985 | Kanakiyo et al. | 160/22 R |
| 4,525,214 | 6/1985 | Panken | 106/21 R |
| 4,525,215 | 6/1985 | Shioi et al. | 106/22 R |
| 4,525,216 | 6/1985 | Nakanishi | 106/23 B |
| 4,557,618 | 12/1985 | Iwata et al. | 106/20 R |
| 4,578,117 | 3/1986 | Nakanishi | 106/20 A |
| 4,604,139 | 8/1986 | Shioi et al. | 106/23 C |
| 4,617,058 | 10/1986 | Lee | 106/19 B |
| 4,620,941 | 11/1986 | Yoshikawa et al. | 252/408.1 |
| 4,681,471 | 7/1987 | Hayduchok et al. | 106/22 B |
| 4,708,817 | 11/1987 | Dudnick | 106/22 B |
| 4,725,316 | 2/1988 | Mahany, II | 106/499 |
| 4,732,614 | 3/1988 | Brooks et al. | 106/23 B |
| 4,741,774 | 5/1988 | Lazar | 106/19 B |
| 4,744,826 | 5/1988 | Iijima | 106/20 A |
| 4,889,559 | 12/1989 | Goldberg et al. | 106/21 C |
| 4,907,903 | 3/1990 | Kawashima | 106/21 R |
| 4,942,185 | 7/1990 | Inoue et al. | 521/54 |
| 4,954,174 | 9/1990 | Imagawa | 106/27 R |
| 4,954,544 | 9/1990 | Chandaria | 524/111 |
| 4,988,123 | 1/1991 | Lin et al. | 106/23 R |
| 5,004,763 | 4/1991 | Imagawa | 523/161 |
| 5,006,171 | 4/1991 | Mecke et al. | 106/20 A |
| 5,009,536 | 4/1991 | Inoue et al. | 106/20 C |
| 5,017,226 | 5/1991 | Kulisz | 106/21 C |
| 5,024,699 | 6/1991 | Llyama et al. | 106/21 A |
| 5,043,013 | 8/1991 | Kluger et al. | 106/20 R |
| 5,082,386 | 1/1992 | Hironaka et al. | 401/206 |
| 5,106,881 | 4/1992 | Inoue et al. | 521/54 |
| 5,118,350 | 6/1992 | Prasad | 106/21 R |
| 5,120,359 | 6/1992 | Uzukawa et al. | 106/20 A |
| 5,139,572 | 8/1992 | Kawashima | 106/21 R |
| 5,176,746 | 1/1993 | Nakanishi et al. | 106/25 R |
| 5,196,237 | 3/1993 | May | 427/288 |
| 5,196,243 | 3/1993 | Kawashima | 106/21 R |
| 5,203,913 | 4/1993 | Yamamoto et al. | 106/22 B |
| 5,215,956 | 6/1993 | Kawashima | 106/21 R |
| 5,222,823 | 6/1993 | Conforti | 106/22 B |
| 5,232,494 | 8/1993 | Miller | 106/22 B |
| 5,262,535 | 11/1993 | Kaiser | 106/22 B |
| 5,279,859 | 1/1994 | May | 427/288 |
| 5,302,194 | 4/1994 | Tanabe et al. | 106/21 A |
| 5,324,348 | 6/1994 | Perret, Jr. | 106/19 B |
| 5,326,388 | 7/1994 | Miller et al. | 106/22 B |
| 5,352,282 | 10/1994 | Miller | 106/22 B |

COLOR-CHANGING MARKING COMPOSITION SYSTEM

TECHNICAL FIELD OF THE INVENTION

This invention relates to marking compositions and marking instruments that contain such compositions, such as crayons and pencils.

BACKGROUND OF THE INVENTION

Marking instruments in the form of crayons have been used by young and old for decades. Historically, crayons have been manufactured by mixing together a binder, typically, a molten wax, and a suitable pigment. The molten mixture would be extruded into a desired shape, such as a cylinder, and subsequently cooled to a solid. The resulting crayon, when rubbed on a surface, such as paper, would leave a mark, i.e., a residue of pigmented wax, on the surface.

Over the years, the crayon has undergone a number of changes to improve its appearance, mechanical and marking properties, and toxicity. One of these changes, which affects the appearance of the crayon and the mark that it leaves on a given surface, is color. A wide variety of vivid and attractive colors has been enabled over the years through the development of new pigments. The increase in the number of colors and hues available in the form of a crayon has fueled the demand for further improvements in crayon properties, generally.

One aspect of crayon technology that has undergone significant change over the years is the composition of the binder component. The natural waxes, which were historically used as binders, have been improved through blending and the inclusion of additives. In addition, synthetic materials have been developed to provide, among other advantages, a more uniform distribution of pigment throughout the crayon, which translates into a more uniform distribution of pigment throughout the crayon mark and the ability to effect a mark on a wider range of surfaces.

Another aspect of crayon technology that has undergone significant change over the years is that of "special effects." For example, one special effect that has been attained is phosphorescence. Phosphorescence has been achieved through the introduction of phosphors, substances that emit light when excited by radiation, into the marking composition. Another special effect that has been attained is fluorescence. Fluorescence is attained by the introduction of fluorescers, substances that emit electromagnetic radiation, usually as visible light, resulting from and occurring only during the absorption of radiation from some other source. Other special effects include the introduction of glitter.

Thermochromic dyes, i.e., dyes whose color is sensitive to temperature, and pH- and bleach-sensitive dyes, i.e., dyes whose color is sensitive to pH or bleach, respectively, have been employed in other types of marking compositions to achieve the special effect of color change. For example, U.S. Pat. No. 5,232,494 discloses an aqueous coloring composition system for use in markers, wherein one composition contains a dye whose coloring ability is destroyed in the presence of a bleach, which is contained in a second composition for application on top of a mark generated with the first composition. Such a system which employs an aqueous composition is not, however, suitable for inclusion in a crayon. U.S. Pat. No. 3,957,495 discloses a solid writing material containing a colorless, electron donative, chromogenic compound, which develops color upon contact with a writing surface previously coated with an electron accepting substance. Accordingly, this system requires a specially coated writing surface, such as paper or polyvinyl chloride film, in order to achieve a colored mark on the writing surface with the solid writing material.

Special effects aside, the formulation of any marking composition intended for use in the form of a crayon should be such that it produces a crayon with good appearance, mechanical and marking properties, and relatively low toxicity. More particularly, a crayon should advantageously possess sufficient mechanical strength so that it can successfully withstand rubbing on a surface without undue crumbling or breaking. Moreover, the crayon, when rubbed on a surface, should advantageously provide a relatively uniform laydown, i.e., a relatively smooth and uniform layer of the crayon composition on the surface—without undue flaking. Further, the crayon should provide a mark that is substantially clean, and uniform, in coloration. In addition, the crayon should not be unduly hygroscopic in nature, i.e., it should not absorb water to the extent that it acquires a wet feel and loses mechanical strength.

Obtaining an overall satisfactory marking composition with respect to all of these properties, however, is not an easy task. Rather, new crayon formulations, particularly those into which have been introduced special effects, have been found to be fraught with problems, mainly due to the undesirable interactions between components never before combined together in a crayon composition.

It is, therefore, an object of the present invention to provide a marking composition system, which is suitable for use in the form of crayons and pencils and which provides a special effect.

Another object of the present invention is to provide a special effect marking composition system capable of generating a high quality mark on a variety of surfaces.

Yet another object of the present invention is to provide a special effect marking composition system with good mechanical strength.

Still another object of the present invention is to provide a special effect marking composition system with good appearance.

A further object of the present invention is to provide a special effect marking composition system with relatively low hygroscopicity.

An even further object of the present invention is to provide a special effect marking composition system with relatively low toxicity.

These and other objects and advantages of the present invention, as well as additional inventive features, will be apparent from the description of the invention provided herein.

BRIEF SUMMARY OF THE INVENTION

The present invention provides a marking composition system suitable for use in the form of crayons and pencils and characterized by the special effect of color change, the capacity to generate a high quality mark on a variety of surfaces, good mechanical strength, good appearance, and relatively low hygroscopicity and toxicity. The color-changing marking composition system comprises (a) a first marking composition comprising wax, a dye, which is other than a Leuco dye and which is capable of changing color upon contact with a color change-inducing compound, and a solvent capable of solubilizing the dye, and (b) a second marking composition comprising wax and a color change-inducing compound, which is capable of inducing a color change in a dye with which it is brought in contact. The first marking composition can additionally comprise a pigment, a surfactant, a humectant and/or a compatibilizer. The second marking composition preferably additionally comprises a surfactant, compatibilizer and a polar solvent. A color change is effected by the marking composition system when the second marking composition is used to apply a mark on top of a mark generated on a given surface by the first marking composition. Alternatively, the first marking composition can be applied on top of a mark generated on a given surface by the second marking composition in order to render the mark generated with the second marking composition visible.

DETAILED DESCRIPTION OF THE INVENTION

The present invention is a marking composition system suitable for use in the form of crayons and pencils and characterized by the special effect of color change. A color change is effected by the marking composition system when the second marking composition is applied on top of a mark generated on a given surface by the first marking composition. In essence, the first marking composition of the color-change marking composition system, when solidified, comprises very small droplets of dye solubilized in a polar liquid within a wax matrix. The second marking composition of the color-change marking composition comprises a base and/or reducing agent as very small droplets dispersed within a wax matrix, when solidified. When the second marking composition is applied on top of the first marking composition, the acidic or oxidized form of the dye in the first marking composition interacts with a base or reducing agent in the second marking composition and is converted to its basic or reduced form, thereby effecting a color change. Available in a wide range of color hues, the color changes occur rapidly, i.e., within seconds, are permanent, and do not feather laterally from the site of application to a given surface over time. Alternatively, the first marking composition can be applied on top of a mark generated on a given surface by the second marking composition in order to render the mark generated with the second marking composition visible.

In addition to color change, the marking composition system is easily manufactured according to current crayon manufacturing technology, demonstrating sufficient shrinkage during solidification to enable easy demolding and maintenance of dispersion of the various components in wax during solidification, and, when formed into a marking instrument, such as a crayon or pencil, is characterized by the capacity to generate a high quality mark, i.e., smooth and even, on a variety of surfaces, good mechanical strength, good appearance, and relatively low hygroscopicity and toxicity.

The marking composition system comprises a first marking composition. The first composition comprises wax, a dye, which is other than a Leuco dye and which is capable of changing color upon contact with a color change-inducing compound, and a solvent capable of solubilizing the dye. The first composition can additionally comprise a pigment, a surfactant, a humectant, and/or a compatibilizer.

The wax used in the first marking composition should be one that provides a smooth, uniform and easy laydown when applied to a given surface. It also should be a solid at room temperature, with good mechanical strength. The viscosity of the wax in the molten state should be low enough to facilitate gravity molding of crayons or dipping of pencil leads, although not necessarily low for high viscosity injection or extrusion molded plastic crayons. The wax also should shrink sufficiently upon solidification to facilitate demolding of gravity molded marking instruments, i.e., crayons, and, preferably, is one that is relatively inexpensive. A semi-polar wax optionally can be added to the first marking composition in an amount sufficient to facilitate electron transfer between the dye, present in the first marking composition, and the base, present in the second marking composition. A blend of paraffin, stearyl alcohol and stearamide can be used, although it is preferred that stearamide not be used as it can slow the rate of color change. The paraffin makes the composition harder and less expensive than stearamide/stearyl alcohol blends, alone. Alternatively and preferably, microcrystalline wax, such as ShellWax 650® (Shell Oil Co., Houston, Tex.), can be substituted for a portion of the paraffin wax.

Wax should be added to the first marking composition in an amount sufficient to provide the first marking composition with the desired level of strength, hygroscopicity, capacity to suspend added pigments and dyes, without also providing the composition with a viscosity that is too high for processing into a marking instrument. Wax, in particular paraffin wax, is advantageously present in an amount up to about 70 wt. %, preferably in an amount up to about 25 wt. %. Stearyl alcohol is advantageously present in an amount from about 20 wt. % to about 50 wt. %, preferably in an amount from about 35 wt. % to about 50 wt. %. Stearamide, if added, can be present in an amount up to about 40 wt. %, although it is better not to exceed about 20 wt. %. Microcrystalline wax, such as ShellWax 650®, is advantageously added in an amount from about 2 wt. % to about 20 wt. %, preferably in an amount from about 5 wt. to about 15 wt. %.

The dye used in the first marking composition is other than a Leuco dye and can be changed from an acidic or oxidized form to a basic or reduced form upon reaction with a base or reducing agent, or combination thereof, and will change color upon reaction with a base, referred to as the change-inducing compound, present in the second marking composition. By "change color" is preferably meant a change from one color/hue to another color/hue, although it is also intended to include a change from colored to colorless and a change from colorless to colored. Any dye can be used in the first marking composition as long as it does not adversely affect the marking characteristics of the composition or adversely interact with any of the other components of the composition. Preferably, the dye is one that is water- and/or alcohol-soluble and changes color at a pH>5.

Examples of dyes that can be used in the first marking composition include the dyes marketed under the tradenames Astrazon Blue FRR (Basic Blue 69), Astrazon Brilliant Red 4G (Basic Red 14), Astrazon Pink FBB (Basic Red 49), and Pyranine 120 by Miles(Mobay); and the dyes marketed under the tradenames Acid Green 3 and Acid Violet 19, both by International Dyestuffs Corporation, as well as mixtures thereof. Other examples of dyes, all of which can be obtained from Aldrich Chemical Co., Milwaukee, Wis., include Acid Blue 93, Methyl Red, Bromocresol Purple, Bromothymol Blue, Phenol Red, 0-Cresolphthalein, and phenolphthalein. The reaction of such dyes is described in *Chemical Separations and Measurements*, Peters et al., W. B. Saunders Co., 1974, pp. 116–119.

The listed Astrazon dyes are classified as polymethine dyes. Polymethine dyes are colored substances in which a series of —CH= groups connect to terminal groups of a chromophore. Polymethine and cyanine are often used interchangeably as generic terms for all polymethine dyes. The previous primary usage for polymethine dyes was dying acetate rayon as well as polyacrylonitrile and polyacrylamide.

Acid Green 3, Acid Violet 19 and Methyl Red are azo dyes, which is the largest and most versatile class of dyes, and characterized by the presence of one or more —N═ (azo) groups. Acid Green 3 is commonly used in making pulp colors or lakes. Acid Violet dyes are primarily fashion colors.

Dyes that are highly resistant to chemical attack, such as by a bleaching agent, or to high pH conditions, include pyranine 120, Acid Red 52 (Carolina Color), Food Red 14 (Hilton-Davis), Basantol Green 910 (BASF), Acid Red 87 (Hilton-Davis), Acid Red 92 (International Dyestuffs Corporation), and mixtures thereof.

Acid Red dyes, classified as xanthene dyes, are generally used as colorants for foods, drugs and cosmetics. Specifically, Acid Red 87 is the disodium salt of 2,4,5,7-tetrabromo-9-O-carboxyphenyl-6-hydroxy-3-isoxanthone. Acid Red 87 is also called D&C Red No. 22 by the Food and Drug Administration (FDA) and sold under the tradenames Eosine YS and Eosine G. In addition, Acid Red 92, the disodium salt of 2,4,5,7-tetrabromo-9-(3,4,5,6-tetrachloro-O-carboxyphenyl)-6-hydroxy-3-isoxanthone is called D&C Red No. 28 by the FDA, and sold under the tradename Phloxine B. Acid Red 52 is a colorant for plastics. Further, Food Red 14 or FD&C Red No. 3, commercially available under the tradenames Erythrosine and Erythrosine Bluish, is the disodium salt of 9-(O-carboxyphenyl)-6-hydroxy-2,4,5,7-tetraiodo-3H-xanthen- 3-one, which contains small amounts of lower iodinated fluoresceins.

The minimum concentration of dye that will produce a workable solid marking composition is governed by the color intensity and degree of color change desired. The maximum concentration of dye is determined largely by the ability to maintain a stable composition and the depth of color and degree of color change desired and can vary widely depending upon the concentrations of other components.

One or more dyes are advantageously added to the first marking composition in an amount sufficient to provide the first marking composition with the desired color and resulting color change, upon contact with the second marking composition, without adversely affecting the marking characteristics, e.g., laydown, of the composition. The dye component is advantageously present in an amount from about 0.1 wt. % to about 5 wt. %, preferably in an amount from about 0.1 wt. % to about 1 wt. %.

Pigments can be used as colorants in the marking compositions, preferably in the first marking composition and not in the second marking composition, of the present invention. For example, a pigment can be used to enhance the initial color of the dye, i.e., the color of the dye before it comes in contact with a color change-inducing chemical, or to mask the color of the dye. For example, a blue dye, e.g., AB93, which becomes colorless upon contact with a color change-inducing compound, can be combined with a yellow pigment to produce a first marking composition that is green in color. Upon contact with the color change-inducing compound in the second marking composition, the blue dye becomes colorless, while the yellow pigment remains yellow in color, thereby effecting a color change from green to yellow when the second marking composition is applied on top of a mark generated with the first marking composition.

In general, a workable pigment dispersion may have a wide or narrow particle size range as long as it does not adversely affect the marking characteristics of the composition. Pigments having a mean particle size range from about 0.1 to about 15 μ can be used in the marking compositions. Examples of suitable pigments include Pigment Red 184, Pigment Blue 15-3, and Pigment Black T (all by Hoescht Celanese Corp.). The minimum concentration of pigment which will produce a workable color-changing composition is governed by the color intensity desired. The maximum workable concentration of pigment is determined largely by the ability to maintain a stable composition without adversely affecting the marking characteristics of the composition, and can vary widely depending upon the concentration of other components. The pigment is advantageously present in an amount from about 0.5 wt. % to about 10 wt. %, preferably in an amount from about 1 wt. % to about 5 wt. %.

The solvent used in the first marking composition must be one that is capable of solubilizing the dye. Preferably, the solvent is polar, since a water- and/or alcohol-soluble dye is preferably used. Depending on the dye, water can be used to solubilize the dye, if necessary. A preferred solvent is water and/or glycerol or a combination of water and N-methyl pyrrolidone. The solvent is advantageously present in the first marking composition in an amount from about 0.5 wt. % to about 10 wt. %, preferably in an amount from about 0.5 wt. % to about 3 wt. %.

When water is used as the solvent and the temperature of the wax melt is above the boiling point of water, it is desirable to add a humectant to retard evaporation of the water. A preferred humectant is glycerol, which also can be added to primarily function as a solvent. The humectant is advantageously added to the first marking composition in an amount from about 0.5 wt. % to about 5 wt. %, preferably in an amount from about 1 wt. % to about 3 wt. %.

A surfactant is desirable to disperse the polar solvent containing the dye in the wax matrix of the first marking composition and to maintain the dispersion in fine particle form during the solidification process. The surfactant functions in various ways, e.g., to modify the consistency of the composition, thereby modifying the marking characteristics of the composition, to enhance the laydown of the composition, to enhance the compatibility of the various components of the composition, to facilitate the mixing of the composition by acting as a dispersant for the various non-soluble components of the composition, and to contribute to the release of the composition from a mold.

A preferred surfactant for alcohol-soluble dyes is a nonionic surfactant, such as the Triton-X series (Union Carbide, Danbury, Conn.). An especially preferred surfactant system for alcohol-soluble dyes is a mixture of a high HLB (hydrophilic lipophilic balance) surfactant, i.e., between about 17 and about 40, such as Triton X-405, and a low HLB surfactant, i.e., between about 2.7 and about 4.0, such as Triton X-15. The ratio of low HLB to high HLB surfactant must be between about 1:6 and 4:1. The ratio of Triton X-405 to Triton X-15 for alcohol-soluble dyes is preferably 1:1. It is preferable to substitute an anionic high HLB surfactant, such as sodium lauryl sulfate (SLS), for Triton X-405 to give a ratio of SLS to Triton X-15 of 6:1. The surfactant is advantageously added to the first marking composition in an amount from about 1 wt. % to about 7 wt. %, preferably in an amount from about 1 wt. % to about 3 wt. %. In general, less surfactant is required for alcohol-soluble dyes than for water-soluble dyes.

A compatibilizer is desirable to assist the compatibilizing of the wax and the polar solvent in the first marking composition. However, it is not critical to the performance of the first marking composition. Dibutyl phthalate, benzyl butyl phthalate, and N-methyl pyrrolidone are examples of suitable compatibilizers. Santicizer 160 (butyl benzyl phthalate, Monsanto Chem. Co., St. Louis, Mo.) is a commercially available compatibilizer. The compatibilizer is advantageously added in an amount from about 1 wt. % to about 10 wt. %, preferably in an amount from about 4 wt. % to about 6 wt.

The first marking composition can be contacted with any color change-inducing compound in an amount capable of inducing a color change in the dye present in the first marking composition. Advantageously, however, a second marking composition is employed in the color-change marking composition system of the present invention. This second marking composition comprises wax and a color change-inducing compound, which is capable of inducing a color change in a dye with which it is brought in contact. Preferably, the second marking composition additionally comprises a surfactant, a compatibilizer, and a polar carrier.

The wax used in the second marking composition is one having the same characteristics as the wax used in the first marking composition.

Wax should be added to the second marking composition in an amount sufficient to provide the second marking composition with the desired level of strength, hygroscopicity, without also providing the composition with a viscosity that is too high for processing into a marking instrument, such as a pencil or crayon. Wax, in particular paraffin wax, is advantageously present in an amount up to about 95 wt. %, preferably in an amount up to about 65 wt. %. Stearyl alcohol is advantageously present in up to about 75 wt. %, preferably in an amount up to about 15 wt. %. Stearamide is advantageously present in an amount up to about 75 wt. %, preferably in an amount up to about 15 wt. %. Microcrystalline wax, such as ShellWax 650®, is advantageously present in an amount from about 2 wt. % to about 20 wt. %, preferably in an amount from about 5 wt. % to about 15 wt. %.

The color change-inducing compound used in the second marking composition is one that will provide a sufficiently high pH, or reducing power, to change the color of the dye that is present in the first marking composition. In other words, the color change-inducing compound must be sufficiently basic or reductive to change the dye from its acidic or oxidized form to its basic or reduced form. It also preferably is a nonvolatile active component during crayon manufacture and after application to a given surface.

The color change-inducing compound is advantageously an amine, such as triethanolamine or oleyl amine, and/or a hydroxide, such as potassium hydroxide. Preferably, the compound comprises triethanolamine, which is a relatively polar liquid with low volatility, in combination with potassium hydroxide. The potassium hydroxide increases the pH and, therefore, provides a more universal color change-inducing compound. Alternatively, a combination of N-methyl pyrrolidone and potassium hydroxide can be used. A more volatile primary amine, such as oleyl amine, will change color faster but diffuses laterally from a mark on a given surface and loses color over time. Rapid color change and permanence can be attained without such drawbacks by using about an 80/20 or about a 90/10 mix of triethanolamine/oleyl amine. The mix is appropriately used with dyes that change color at a pH≦5, such as bromocresol purple, but not with dyes that require a high pH change.

When amine and hydroxide are used together as the color-change inducer, the amine is advantageously added to the second marking composition in an amount up to about 9 wt. %, preferably in an amount up to about 4 wt. If the amine is oleyl amine, it is advantageously added in an amount up to about 3 wt. % preferably in an amount up to about 1 wt. %. Potassium hydroxide is advantageously added in an amount up to about 4 wt. %, preferably in an amount up to about 3 wt. %.

The surfactant is added to the second marking composition to disperse the polar phase in the molten wax and to maintain the dispersion in fine particle form during the solidification process. A variety of surfactants can be used for the generally small amount of polar component needed, i.e., 2–4%. Larger levels of polar component or the incorporation of salts makes it more difficult to disperse the polar phase. Preferably, the surfactant is sodium lauryl sulfate, one or more of a mono ester of a polyol or fatty acid, a diester of a polyol or fatty acid, a nonionic block copolymer of propylene oxide and ethylene oxide, an ethylene oxide condensation product, a nonylphenol ethoxylate, an ethyleneoxy ethanol, or a polyoxyethylene ether alcohol.

Mixtures of surfactants are advantageous under certain manufacturing conditions and to obtain a proper balance of properties in a particular form of the composition. More specifically, and especially if the composition is to be employed in a gravity-molded crayon product, the surfactant preferably includes Triton X-15 (octyl phenol ether with one ethylene oxide) and SLS.

Best results, in terms of providing good compatibility and a fast change rate, are obtained by use of a low HLB/high HLB mix of surfactants in a 3/1 ratio. By low HLB is meant 4.5 or less, whereas, by high HLB is meant 25 or more. The ratio of low HLB to high HLB surfactant must be between about 6:1 and about 1:2. If a compatibilizing agent is present, however, these ratios may be modified somewhat. A mix of low/high HLB nonionic surfactants also works, but not as well as the Triton X-15/SLS mix. A total surfactant level of around 4% leads to faster color development than a total surfactant level of around 8%, but is not as good for compatibility. Accordingly, a preferred total surfactant level is around 5%. The surfactant is preferably present in the second marking composition in an amount that provides the desired properties in the composition without unduly adversely affecting the mechanical properties of a crayon formed therefrom. SLS is advantageously added in an amount up to about 7 wt. %, preferably in an amount up to about 2 wt. %. Octyl phenol ether containing one ethylene oxide is advantageously added in an amount from about 2 wt. % to about 10 wt. %, preferably in an amount from about 1 wt. % to about 5 wt. %.

The compatibilizer, though not necessary, assists in compatibilizing the wax and the polar phase in the second marking composition. Preferred compatibilizers include dibutyl phthalate, benzyl butyl phthalate, and N-methyl pyrrolidone. Triethanolamine also seems to serve as a compatibilizer in addition to being a base. An especially preferred compatibilizer is butyl benzyl phthalate (Santicizer 160, Monsanto), in an amount from about 2 wt. % and about 4 wt. %, in order to facilitate homogenization.

The polar solvent, though not essential, helps dissolve potassium hydroxide and inorganic reducing agents before dispersing them in the wax mix. Preferred polar carriers include water and/or glycerol or a combination of water and N-methyl pyrrolidone. Water is advantageously added in an amount up to about 5 wt. %, preferably in an amount up to about 1 wt. %, whereas glycerol is advantageously added in an amount up to about 6 wt. %.

Optionally, the marking compositions can comprise an extender. The extender selected should be inert in regard to the other components of the composition, and is advantageously selected and provided so as to provide the composition with characteristics that are desirable from a processing perspective. The amount of extender added to the second marking composition should not be so great as to adversely affect the other desirable properties of the marking composition, such as smoothness of writing, mechanical strength, and color intensity.

Examples of solid or inorganic extenders that are suitable for use include clay, calcium carbonate, talc and mica, with talc being preferred, due to its relatively small particle size and translucence. An example of a preferred talc product is Nytal 400 (R. T. Vanderbilt, Co., Inc., Norwalk, Conn.). The extender imparts strength to the composition while lowering its cost of production.

In general, the marking compositions are prepared by dissolving the polar material in a minimum amount of polar solvent. The polar solvent is then combined with a mix of a high HLB and a low HLB surfactant. The exact types of surfactants and the ratios employed for optimal color-change marking compositions is a function of the specific polar phase used. Optionally, a limited amount of semi-polar wax(es), e.g., stearamide and/or stearyl alcohol, can be used in combination with paraffin wax, for example, to provide a marking composition with a higher polar component tolerance and to provide sufficient hardness for writing on a given surface, such as a paper substrate. The components are melted together with mild agitation and the temperature is raised to between about 105° C. to about 120° C. If necessary, during the course of production, premature solidification can be prevented during transfer operations by heating to a higher temperature. If water has been added as a solvent and the temperature of the wax melt is above the boiling point of water, it is desirable to add a humectant to the polar phase in order to retard the evaporation of the water. However, care should be taken not to boil off too much water, if present, from the molten composition, although limited loss of water does not seem to affect performance. The molten system is subsequently formed into the desired marking instrument.

The marking compositions may be formed into any one of a number of marking instruments, such as a crayon or injection molded marking instrument or a pencil lead, including those ensheathed in wood or encased in plastic, by any suitable means. For example, a crayon can be formed by pouring the molten composition into a cooled steel crayon mold. Methods for accomplishing this are well-known to those of skill in the art, and, accordingly, will not be recited herein.

The following examples are, therefore, illustrative of the present invention and are not intended to be limiting. All percentages are weight percent of the composition, unless specified otherwise.

Example 1

This example describes the formulation of color-change marking compositions, suitable for use in the form of a crayon or pencil, and the formation of color-change crayons from the marking compositions.

The first marking composition was prepared by weighing the wax components, paraffin, stearyl alcohol and stearamide (if used), into a stainless steel beaker and placing the beaker on a hot plate to melt the components. Deionized water, dye powder, glycerol, SLS, Triton X-15 and Santicizer 160 were weighed into a separate beaker, stirred with a spatula, and transferred to the steel beaker containing the molten wax. The hot mixture was stirred with the spatula to homogenize the hot mixture. The final temperature was generally between 100° C. and 120° C. The melt was then cooled in the stainless steel beaker or, in some cases, poured into a steel crayon mold for solidification.

The second marking composition was prepared by weighing KOH (if used), water (if used), triethanolamine, lauryl amine (if used), N-methyl pyrrolidone (if used), Santicizer 160 (if used), surfactant(s), stearamide, stearyl alcohol, paraffin wax, and other wax (if used), in that order. The beaker was placed on a hot plate. When almost all of the components had melted, a thermometer was used to stir the mixture until it was fully melted and homogeneous. The temperature of the melt was raised to between about 105° C. and about 120° C. prior to molding. The hot melt was then allowed to cool in the beaker by placing the beaker in a larger beaker partially filled with tap water at room temperature. Alternatively, the hot melt was poured into cylindrical, 7/16 diameter, steel crayon molds and allowed to solidify. Cold tap water was used to cool the molds.

EXAMPLES 2–8

These examples describe preferred formulations for the first marking composition.

TABLE I

| | | FIRST MARKING COMPOSITION CRAYON FORMULATIONS | | | | | | | | |
|---|---|---|---|---|---|---|---|---|---|---|
| INGREDIENTS | SOLU-BILITY | 205-67C violet to yellow | 205-68B orange to yellow | 205-68F yellow to magenta | 205-68I blue to yellow | 205-68J red to blue | 205-68L yellow to blue | 205-68O clear to purple | 205-78E green to yellow | 205-78N blue to colorless |
| Acid Violet 19 | water | 0.10 | — | — | — | — | — | — | — | — |
| Acid Blue 93 | water | — | — | — | 0.10 | — | — | — | 0.24 | 0.5 |
| Pyranine 120 | water | 0.10 | — | — | 0.10 | — | — | — | — | — |
| Diarylide Yellow Pigment | — | — | — | — | — | — | — | — | 2.40 | — |
| Methyl Red | alcohol | — | 0.25 | — | — | — | — | — | — | — |
| Bromocresol Purple | alcohol | — | — | — | — | — | 0.25 | — | — | — |
| Basic Red 49 | water | — | — | — | — | 0.10 | — | — | — | — |
| Bromothymol Blue | alcohol | — | — | — | — | 0.10 | — | — | — | — |
| Phenol Red | alcohol | — | — | 0.25 | — | — | — | — | — | — |
| O-Cresolphthalein | alcohol | — | — | — | — | — | — | 0.25 | — | — |
| D.I. Water | | 1.51 | — | — | 1.51 | 1.51 | — | — | 1.44 | 1.47 |

TABLE I-continued

FIRST MARKING COMPOSITION CRAYON FORMULATIONS

| INGREDIENTS | SOLU-BILITY | 205-67C violet to yellow | 205-68B orange to yellow | 205-68F yellow to magenta | 205-68I blue to yellow | 205-68J red to blue | 205-68L yellow to blue | 205-68O clear to purple | 205-78E green to yellow | 205-78N blue to colorless |
|---|---|---|---|---|---|---|---|---|---|---|
| Glycerol | | 2.32 | 2.34 | 2.34 | 2.32 | 2.32 | 2.34 | 2.34 | 1.44 | 1.47 |
| Sodium Lauryl Sulfate | | 4.63 | 3.15 | 3.15 | 4.64 | 4.63 | 3.15 | 3.15 | 5.77 | 5.90 |
| Triton X-15 | | 0.75 | 5.15 | 3.15 | 0.76 | 0.75 | 3.15 | 3.15 | 0.48 | 0.49 |
| Santicizer 160 | | 6.04 | 4.72 | 4.72 | 6.05 | 6.04 | 4.72 | 4.72 | 4.81 | 4.91 |
| ShellWax 650 | | — | — | — | — | — | — | — | 41.71 | 42.63 |
| Stearyl Alcohol | | 30.23 | 43.19 | 42.26 | 30.23 | 43.19 | 43.19 | 41.71 | 42.63 | |
| Paraffin Wax | | 54.32 | 43.19 | 43.19 | 42.26 | 54.32 | 43.19 | 43.19 | — | — |
| TOTAL | | 100 | 100 | 100 | 100 | 100 | 100 | 100 | 100 | 100 |

The marking compositions of Table I were then melted and molded into crayons. The resulting crayons generated high quality marks on a variety of surfaces, had good mechanical strength, good appearance, low hygroscopicity, high viscosity, low toxicity, and uniform laydown. The marks generated with the resulting crayons also changed color rapidly upon overlay with a mark generated with a crayon formed from the second marking composition.

Example 9

This example describes preferred formulations for the second marking composition.

TABLE II

SECOND MARKING COMPOSITION FORMULATIONS

| | Preferred Wt. % | Workable Wt. % |
|---|---|---|
| Potassium Hydroxide | 1.5 | 0–4 |
| Glycerol | 0 | 0–6 |
| Triethanolamine | 3.2 | 0–9 |
| Oleyl Amine | 0.8 | 0–3 |
| Deionized Water | 0.5 | 0–5 |
| Sodium Lauryl Sulfate | 1.25 | 0.4–4 |
| Triton X-15 | 3.75 | 2–10 |
| 141F Paraffin Wax | 64 | to make 100% |
| Stearamide | 12 | 0–75 |
| Stearyl Alcohol | 12 | 0–75 |

The marking compositions of Table II were then melted and molded into crayons. The resulting crayons generated high quality marks, whether colored or colorless, on a variety of surfaces, had good mechanical strength, good appearance, low hygroscopicity, high viscosity, low toxicity, and uniform laydown. The resulting crayons also produced rapid color changes upon application of marks on top of marks generated on a given surface by a crayon formed from the first marking composition.

All of the references cited herein, including patents, patent applications and journal articles, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A color-changing marking composition system comprising:
    (a) a first marking composition comprising a wax, a dye which is other than a Leuco dye and which changes color when contacted with a color change-inducing compound, and a solvent capable of solubilizing the dye; and
    (b) a second marking composition comprising a wax and a color change-inducing compound which when contacted with the dye induces a color change in the dye.

2. The color-changing marking composition system of claim 1, wherein said dye in said first marking composition is selected from the group consisting of polymethine dyes, azo dyes, xanthene dyes, sulfonphthalein dyes, phthalide dyes, and mixtures thereof.

3. The color-changing marking composition system of claim 2, wherein said dye in said first marking composition is selected from the group consisting of Basic Blue 69, Basic Red 14, Basic Red 49, Pyranine 120, Acid Green 3, Acid Violet 19, Acid Blue 93, Acid Red 87, Acid Red 92, Food Red 14, Methyl Red, Bromocresol Purple, Bromothymol Blue, Phenol Red, O-Cresolphthalein, phenolphthalein, and mixtures thereof.

4. The color-changing marking composition system of claim 2, wherein said dye in said first marking composition is present in an amount from about 0.1 wt. % to about 5 wt. %.

5. The color-changing marking composition system of claim 4, wherein said dye in said first marking composition is present in an amount from about 0.1 wt. % to about 1 wt. %.

6. The color-changing marking composition system of claim 1, wherein said color change-inducing compound comprises an amine, an hydroxide, a pyrrolidone, or a mixture thereof.

7. The color-changing marking composition system of claim 6, wherein said color change-inducing compound in said second marking composition is selected from the group consisting of potassium hydroxide; triethanolamine; potassium hydroxide and triethanolamine combined; potassium hydroxide and N-methyl pyrrolidone combined; oleyl amine; and triethanolamine and oleyl amine combined.

8. The color-changing marking composition system of claim 7, wherein said color change-inducing compound in said marking composition is triethanolamine and oleyl amine combined.

9. The color-changing marking composition system of claim 8, wherein said triethanolamine and oleyl amine are present in a ratio of about 80/20 to about 90/10.

10. The color-changing marking composition system of claim 8, wherein said triethanolamine is present in an amount up to about 9 wt. % and said oleyl amine is present in an amount up to about 3 wt. %.

11. The color-changing marking composition system of claim 10, wherein said triethanolamine is present in an amount up to about 4 wt. % and said oleyl amine is present in an amount up to about 1 wt. %.

12. The color-changing marking composition system of claim 7, wherein said color change-inducing compound in said marking composition is potassium hydroxide and triethanolamine combined.

13. The color-changing marking composition system of claim 1, wherein said wax in said first and second marking compositions is selected from the group consisting of paraffin; paraffin and stearyl alcohol combined; and paraffin, stearyl alcohol and stearamide combined.

14. The color-changing marking composition system of claim 1, wherein said wax in said first and second marking compositions additionally comprises a microcrystalline wax.

15. The color-changing marking composition system of claim 13, wherein, in the first marking composition, paraffin is present in an amount up to about 70 wt. %, stearyl alcohol is present in an amount from about 20 wt. % to about 50 wt. %, and stearamide is present in an amount up to about 40 wt. %; and in the second marking composition, paraffin is present in an amount up to about 95 wt. %, stearyl alcohol is present in an amount up to about 75 wt. %, and stearamide is present in an amount up to about 75 wt. %.

16. The color-changing marking composition system of claim 15, wherein, in the first marking composition, paraffin is present in an amount up to about 25 wt. %, stearyl alcohol is present in an amount from about 35 wt. % to about 50 wt. %, and stearamide is present in an amount up to about 20 wt. %; and in the second marking composition, paraffin is present in an amount up to about 65 wt. %, stearyl alcohol is present in an amount up to about 15 wt. %, and stearamide is present in an amount up to about 15 wt. %.

17. The color-changing marking composition system of claim 14, wherein said microcrystalline wax is present in an amount from about 2 wt. % to about 20 wt. %.

18. The color-changing marking composition system of claim 17, wherein said microcrystalline wax is present in an amount from about 5 wt. % to about 15 wt. %.

19. The color-changing marking composition system of claim 1, wherein said solvent in said first marking composition is selected from the group consisting of water, glycerol, N-methyl pyrrolidone, and mixtures thereof.

20. The color-changing marking composition system of claim 19, wherein said solvent is present in an amount from about 0.5 wt. % to about 10 wt. %.

21. The color-changing marking composition system of claim 20, wherein said solvent is present in an amount from about 0.5 wt. % to about 3 wt. %.

22. The color-changing marking composition system of claim 1, wherein said first marking composition additionally comprises a pigment in an amount from about 0.5 wt. % to about 10 wt. %.

23. The color-changing marking composition system of claim 22, wherein said pigment is present in an amount from about 1 wt. % to about 5 wt. %.

24. The color-changing marking composition system of claim 1, wherein said first and second marking compositions additionally comprise one or more of a surfactant and/or a compatibilizer.

25. The color-changing marking composition system of claim 24, wherein said surfactant is a mixture of a low HLB surfactant and a high HLB surfactant and said compatibilizer is selected from the group consisting of dibutyl phthalate, benzyl butyl phthalate, N-methyl pyrrolidone, and mixtures thereof.

26. The color-changing marking composition system of claim 25, wherein, in said first marking composition, said low HLB surfactant and said high HLB surfactant are present in a ratio from about 1:6 to about 4:1; and in said second marking composition, said low HLB surfactant and said high HLB surfactant are present in a ratio of from about 6:1 to about 1:2.

27. The color-changing marking composition system of claim 26, wherein, in said first marking composition, said surfactant is present in an amount from about 1 wt. % to about 7 wt. % and said compatibilizer is present in an amount from about 1 wt. % to about 10 wt. %; and in said second marking composition, said surfactant is present in an amount from about 4 wt. % to about 8 wt. % and said compatibilizer is present in an amount from about 2 wt. % to about 4 wt. %.

28. The color-changing marking composition system of claim 27, wherein, in said first marking composition, said surfactant is present in an amount from about 1 wt. % to about 3 wt. % and said compatibilizer is present in an amount from about 4 wt. % to about 6 wt. %.

29. The color-changing marking composition system of claim 1, wherein said second marking composition additionally comprises a polar solvent.

30. The color-changing marking composition system of claim 29, wherein said polar solvent is selected from the group consisting of water, glycerol, N-methyl pyrrolidone, and mixtures thereof.

31. The color-changing marking composition system of claim 30, wherein said water is present in an amount up to about 5 wt. % and said glycerol is present in an amount up to about 6 wt. %.

32. The color-changing marking composition system of claim 1, wherein, said first marking composition comprises from about 40 wt. % to about 55 wt. % paraffin, from about 30 wt. % to about 50 wt. % stearyl alcohol, from about 4 wt. % to about 6 wt. % butyl benzyl phthalate, from about 2 wt. % to about 20 wt. % microcrystalline wax, from about 1 wt. % to about 7 wt. % surfactant, from about 2 wt. % to about 3 wt. % glycerol, from about 1 wt. % to about 2 wt. % water, and from about 0.1 wt. % to about 0.3 wt. % dye; and said second marking composition comprises from about 1.5 wt. % potassium hydroxide, from about 3 wt. % to about 4 wt. % triethanolamine, from about 0.5 wt. % to about 1 wt. % oleyl amine, from about 0.1 wt. % to about 1.0 wt. % water, around 5 wt. % surfactant, from about 60 wt. % to about 65 wt. % paraffin, from about 2 wt. % to about 20 wt. % microcrystalline wax, from about 10 wt. % to about 15 wt. % stearamide, and from about 10 wt. % to about 15 wt. % stearyl alcohol.

\* \* \* \* \*